(12) United States Patent
MacKenzie Turner et al.

(10) Patent No.: US 7,726,916 B2
(45) Date of Patent: Jun. 1, 2010

(54) DOWELLING JIG

(76) Inventors: Luke MacKenzie Turner, 162 Leadbeatters Lane, Alstonville, New South Wales (AU) 2477; Bruce MacKenzie Turner, 162 Leadbeatters Lane, Alstonville, New South Wales (AU) 2477

(*) Notice: Subject to any disclaimer, the term of this patent is extended or adjusted under 35 U.S.C. 154(b) by 316 days.

(21) Appl. No.: 11/817,240

(22) PCT Filed: Feb. 15, 2006

(86) PCT No.: PCT/AU2006/000195
§ 371 (c)(1),
(2), (4) Date: Aug. 28, 2007

(87) PCT Pub. No.: WO2006/096903
PCT Pub. Date: Sep. 21, 2006

(65) Prior Publication Data
US 2008/0199267 A1      Aug. 21, 2008

(30) Foreign Application Priority Data
Mar. 15, 2005   (AU)   ............................... 2005901252

(51) Int. Cl.
*B23B 47/28* (2006.01)
(52) U.S. Cl. ...................... 408/97; 408/103; 408/115 R
(58) Field of Classification Search .................. 408/95, 408/97, 98, 103, 115 R, 72 R, 241 G, 234, 408/241 R; *B23B 47/28*
See application file for complete search history.

(56) References Cited

U.S. PATENT DOCUMENTS

| 1,258,137 | A | * | 3/1918 | Neth ....................... 408/115 R |
| 1,335,347 | A | * | 3/1920 | Moulds ........................ 408/88 |
| 2,029,650 | A | * | 2/1936 | Betz ....................... 408/115 R |
| 2,367,582 | A | * | 1/1945 | Honyoust ..................... 408/76 |
| 2,560,382 | A | * | 7/1951 | Barr ............................ 408/97 |
| 3,019,675 | A | * | 2/1962 | Cleveland ................... 408/104 |
| 3,095,915 | A | * | 7/1963 | Tesar et al. ............. 144/144.51 |
| 3,204,493 | A | * | 9/1965 | Severdia ...................... 408/97 |
| 3,273,426 | A | * | 9/1966 | Cleveland ................... 408/109 |
| 5,230,592 | A | * | 7/1993 | Degen et al. ............ 408/115 R |
| 5,308,199 | A | * | 5/1994 | Juang ..................... 408/115 R |
| 5,743,684 | A | * | 4/1998 | Rex ....................... 408/115 R |
| 7,214,008 | B1 | * | 5/2007 | Dods et al. .............. 408/115 R |

FOREIGN PATENT DOCUMENTS

| DE | 3410359 A | 10/1985 |
| EP | 666135 A | 8/1995 |
| FR | 2318011 A | 2/1977 |

* cited by examiner

*Primary Examiner*—Daniel W Howell
(74) *Attorney, Agent, or Firm*—David A. Guerra (57) ABSTRACT

A dowelling jig (10) comprising a pair of spaced apart rail members which comprise an upper rail member (11) and a lower rail member (12), at least one drill guide member (13) which is slidable between the spaced apart rail members and which is releasably lockable relative to at least one of said spaced apart rail members.

17 Claims, 8 Drawing Sheets

DOWELLING JIG

CROSS-REFERENCE TO RELATED APPLICATIONS

This application is an U.S. national phase application under 35 U.S.C. §371 based upon co-pending International Application No. PCT/AU2006/000195 filed on Feb. 15, 2006. Additionally, this U.S. national phase application claims the benefit of priority of co-pending International Application No. PCT/AU2006/000195 filed on Feb. 15, 2006 and Australian Application No. 2005901252 filed on Mar. 15, 2005. The entire disclosures of the prior applications are incorporated herein by reference. The international application was published on Sep. 21, 2006 under Publication No. WO 2006/096903 A1.

TECHNICAL FIELD

This invention relates to dowelling jigs.

BACKGROUND ART

The problem of drilling holes in timber to facilitate the accurate assembly of joinery and furniture using dowels is well known. Dowels are usually short lengths of timber which are used to join wooden sheets together. Initially, holes must be drilled into the wooden sheets and a dowel is then inserted into the hole in each sheet. Glue is usually squeezed into the hole prior to insertion of the dowel. It is critical that the holes in each sheet are precisely aligned to enable the two sheets to be properly joined together via the dowel. Even a small misalignment creates an unacceptable join. Therefore, even a minor inaccuracy in the positioning of dowel holes creates alignment problems which are not simply overcome, and are time consuming to correct or disguise.

It is well known to provide some sort of framework to enable the holes to be accurately drilled into the sheets. These devices are typically called dowelling jigs, and several devices are known. A disadvantage with many types of conventional dowelling jigs is the complexity of the device especially in ensuring that a plurality of holes can be accurately formed in a particular sheet. Other conventional devices are quite fiddly to use. Many devices are very expensive to manufacture and are therefore not readily accepted by cabinet makers and DIY people. Other conventional dowelling jigs are suitable only for forming holes in the face of the material or forming holes in the edge of the material but are not entirely suitable or easy to use to form holes both in the edge and the face of the material. Some conventional dowelling jigs are extremely large and therefore are not very useful in confined spaces or on smaller work benches.

It will be clearly understood that, if a prior art publication is referred to herein, this reference does not constitute an admission that the publication forms part of the common general knowledge in the art in Australia or in any other country.

BRIEF DESCRIPTION OF THE DRAWINGS

An embodiment of the invention will be described with reference to the following drawings in which.

BEST MODE

Referring to the illustrations and initially to FIGS. 1-4, there is illustrated a dowelling jig 10. Dowelling jig 10 in this particular embodiment comprises the following basic components: a machined main member which comprises a pair of spaced apart rail members being an upper rail member 11 and a lower rail member 12, a plurality (in the illustrations, six) drill guide members 13, a bench member 14, and a support assembly which comprises a baseplate 15, and a pair of vertical upright members 16.

Referring specifically to the various components, and initially to the main member, this is made of metal and comprises an integral unit. The unit consists of a pair of spaced apart rail members which comprise an upper rail member 11 and a lower rail member 12. Each rail member is the same length and comprises an elongate straight member having a length of between 40-80 centimeters. Each rail member is not entirely solid and comprises hollowed out portions 17 (see FIG. 3). The upper rail member 11 and the lower rail member 12 are parallel and are spaced apart to form an internal slot or free area in which the various drill guide members 13 can be positioned. The height of this internal area in the particular embodiment is between 4-10 centimeters. The lower horizontal edge of upper rail member 11 and the upper horizontal edge of lower rail member 12 is each provided with a rib or rail 18 to slidingly support and clamp the various drill guide members 13 as will be described in greater detail below.

The rail members 11, 12 are joined relative to each other by end members 19 and as mentioned before, the entire unit can be formed from a unitary piece of metal if desired.

In the particular embodiment shown in FIGS. 1-14, each drill guide members 13 comprises two pieces 20, 21 which are "mirror images". Each piece can be made of brass and is substantially rectangular when viewed in plan. The top and bottom edge of each piece forms part of a channel such that when the two pieces are joined together, the upper edge and the lower edge of the guide member form a channel which engages with rib 18 to allow the drill guide members 13 to slide along the rail members 11, 12.

The drill guide members 13 contain a through bore 22 which has an internal thread. An insert 23 (see FIG. 3) can be threaded into the through bore to be held thereby. The insert 23 comprises a separate member provided with a smooth cylindrical opening extending therethrough. The diameter of the cylindrical opening will determine the size of drill bit that passes therethrough. Various different inserts can be provided each with different diameter smooth cylindrical openings but with the same threaded outside diameter such that these inserts can be interchangeably inserted into the threaded bore 22. Another function of insert 23 is to clamp the two halves 20, 21 together and also to clamp the two halves to rail 18. Thus, in use, insert 23 can be loosely threaded into bore 22 to hold the two pieces together but loosely enough to enable the loosely held drill guide member 13 to slide along rails 18 to a desired position. When in the desired position, insert 23 is tightened to clamp the drill guide member 13 to the rails. This provides an easy-to-use and extremely effective way to enable the various drill guide members 13 to be positioned in place and then tightly clamped to the upper rail member 11 and the lower rail member 12.

Figure 15:
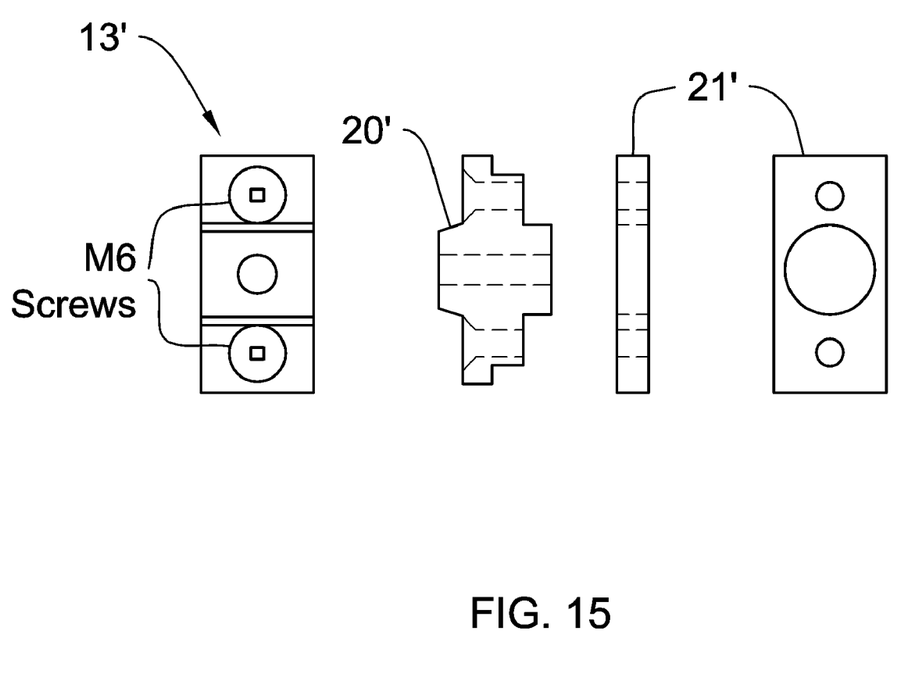
FIG. 15 schematically illustrates a nonlimiting alternative embodiment of a drill guide member that may be used with the dowelling jig.

FIG. 15 shows an alternative embodiment of a drill guide member 13'. In this embodiment, drill guide member 13' again comprise two pieces 20' and 21', and the top and bottom edge thereof again form part of a channel such that when the two pieces are joined together the upper edge and the lower edge of the guide member forms a channel which engages with rib 18 to allow the drill guide member 13' to slide along the rail members 11, 12. However, in this alternative embodiment the two pieces 20' and 21' do not form mirror images of each other. Instead, the two pieces comprise a main drill guide member 20' and a backing plate 21'.

In the alternative embodiment of the drill guide member 13', main drill guide member 20' and backing plate 21' are securable together by a pair of screws insertable into a pair of through-bores contained in the upper and lower portions of the respective main drill guide member 20' and backing plate 21'. The screws are preferably M6 screws (ie having an M6 thread), and the through-bores may be threaded to receive the screws or nuts may be used to retain the screws. Various different drill guide members 13' may be provided with through-bores of varying diameters contained centrally within main drill guide member 20', to receive different sized drill bits. Backing plate 21' contains a wide central through-bore adapted to slot over the protruding cylindrical portion on the back of main drill guide member 20'.

The bench member 14 comprises an elongate L-shaped metal member that extends substantially entirely along the length of lower rail member 12. Bench member 14, by being L-shaped, has a top platform 25 which is substantially horizontal in use, and a vertical part 26. Vertical part 26 contains a pair of spaced apart vertical slots 27, these being best illustrated in FIG. 3. Screw fasteners 28 can then be used to clamp vertical part 26 and therefore bench member 14 to lower rail member 12. The idea of the vertical slot is to enable the height of bench member 14 to be adjusted relative to drill guide members 13. For instance, if a hole needs to be drilled into the edge of a work piece (see for instance FIG. 10), the work piece is clamped to top platform 25 and it is necessary to adjust the height of the top platform to ensure that the hole is formed substantially in the middle of the edge of the work piece. This can be achieved simply using the arrangement described above.

Bench member 14 can be adjusted very finely by a pair of thumbscrews 29 that can be rotated to lift and lower the bench member.

Figure 4:
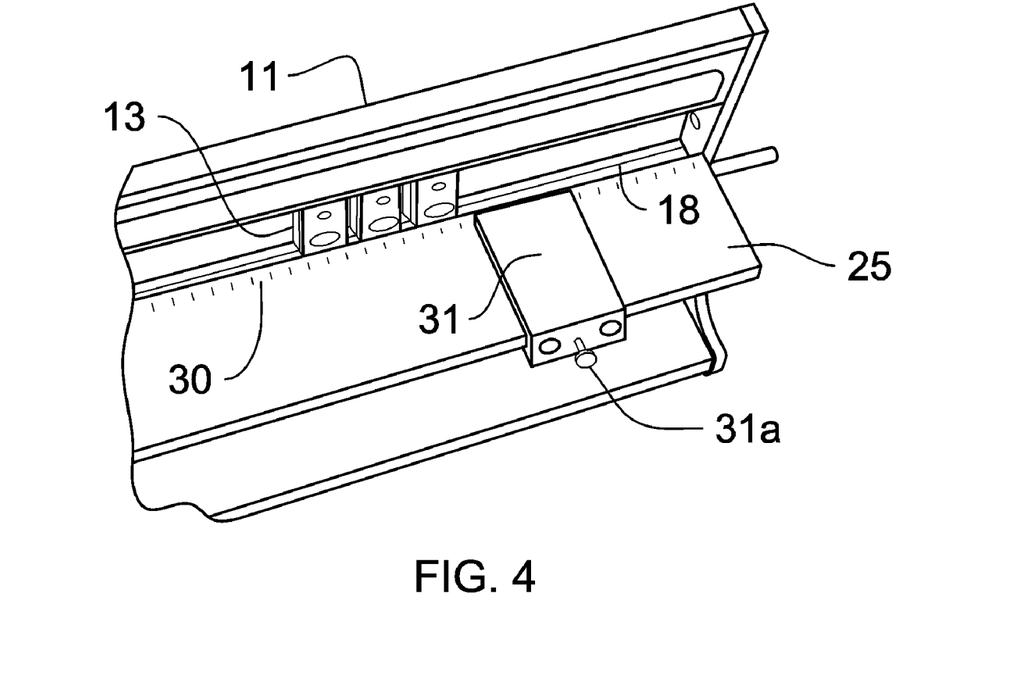
FIG. 4 illustrates a top view of parts of the dowelling jig of FIG. 1.
Figure 5:
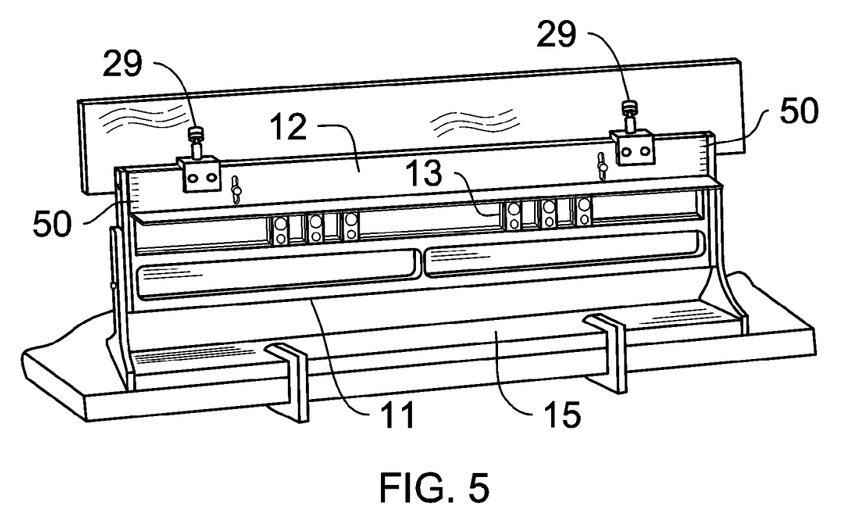
FIG. 5 illustrates the dowelling jig in an upside-down position and with the bench member removed.
Figure 6:
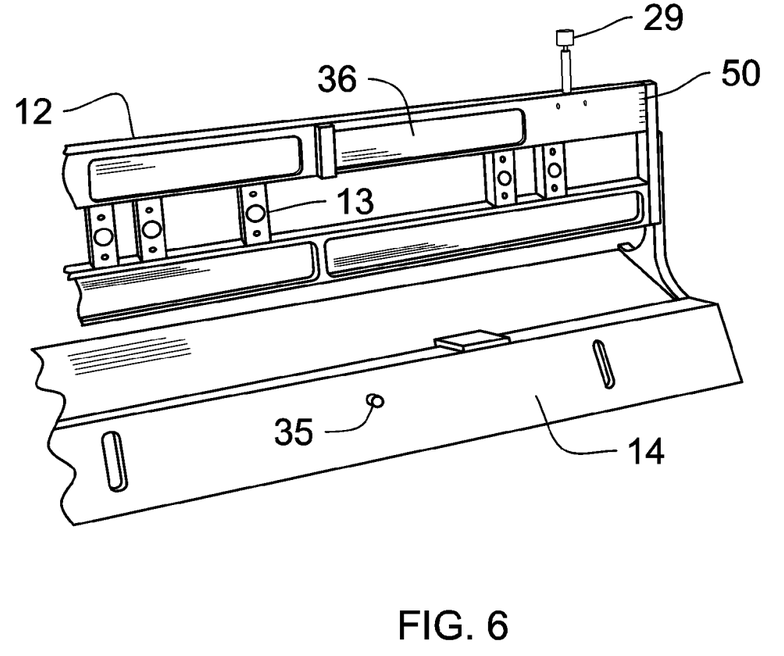
FIG. 6 illustrates the dowelling jig in an upside-down position and also illustrates the bench member separated from the dowelling jig but showing how the bench member can be positioned in place.

The jig is provided with measuring indicia 40, this being best illustrated in FIG. 4 and this provides an extremely accurate way to position the various drill guide members 13 correctly.

The lower frame member is provided with indicia 50 to enable the bench to be accurately positioned.

A stop member 31 is provided on bench member 14. Stop member 31 is best illustrated in FIG. 4. Stop member 31 is slidingly and clampingly attachable to platform 25 and can be clamped in place by small clamping screws 31a. Stop member 31 functions to provide an edge for the work piece to enable the work piece to be correctly positioned relative to the various drill guide members 13.

The rail members 11, 12 are supported above the ground by a support. In the embodiment, the support comprises a horizontal flat base plate 15 and a pair of vertical upright metal members 16, The upright members are pivotly attached to members 19 to enable the rail members 11, 12 to pivot by at least 180° between an "upright" position illustrated in FIGS. 1-4, and an "upside down" position illustrated in FIG. 5. The rail members can be held in the "upright" position by steel pins 41 (see FIG. 1). These pins can be pulled away to enable the rail members to be rotated to the "upside down" position.

Figure 7:
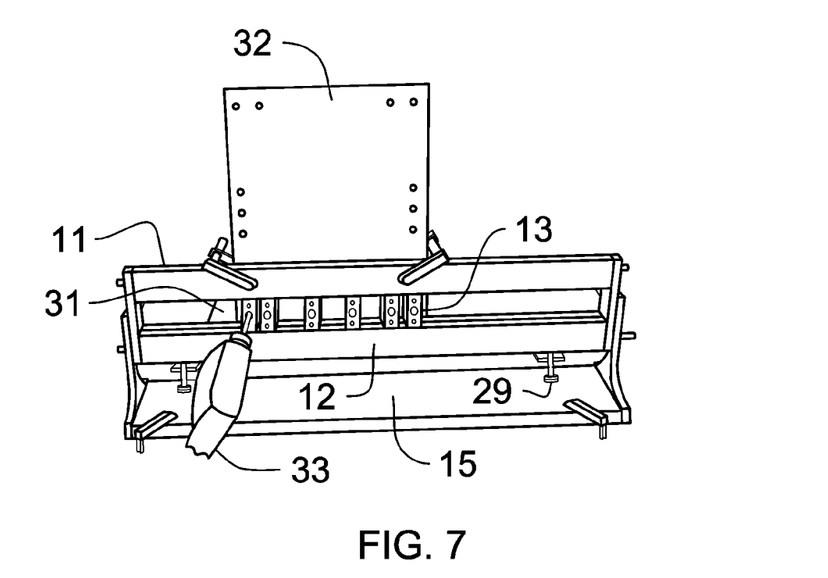
FIG. 7 illustrates a square work piece clamped to the dowelling jig and showing a hole being drilled into the work piece.
Figure 8:
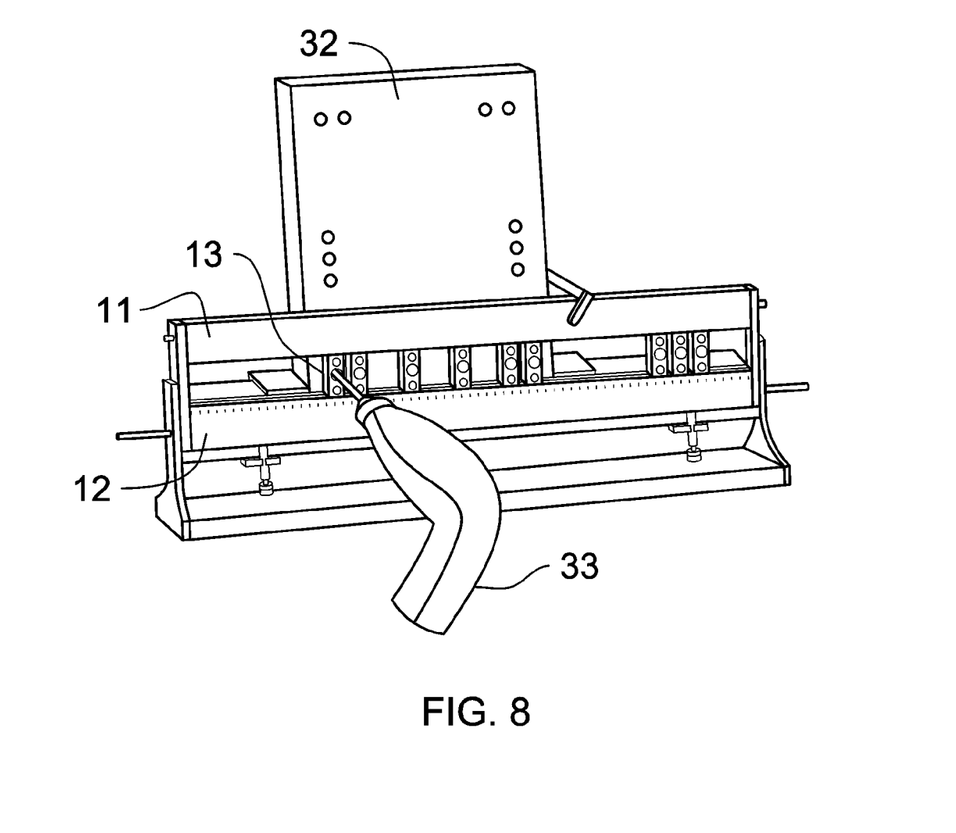
FIG. 8 illustrates a second hole being drilled into the work piece.
Figure 9:
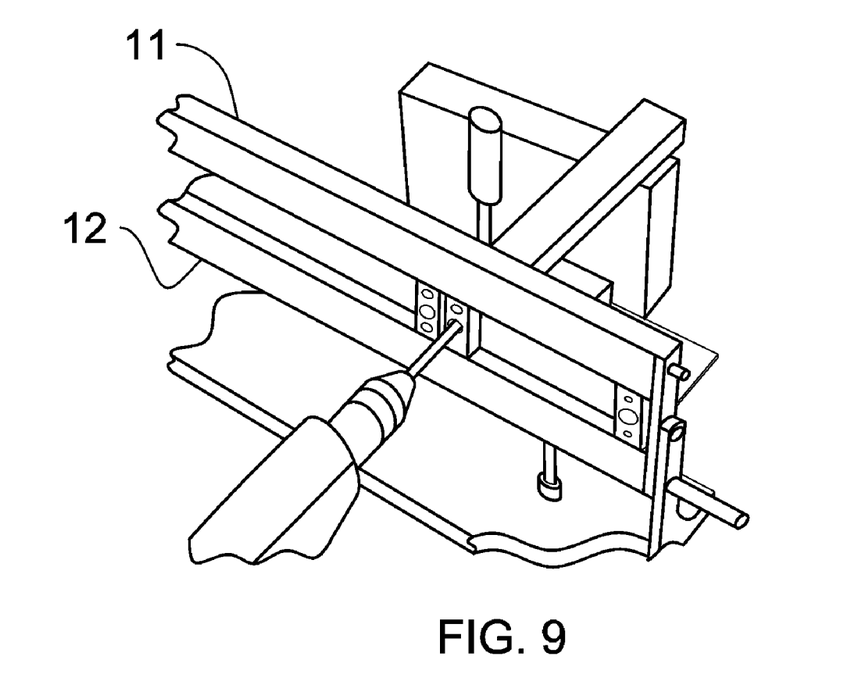
FIG. 9 illustrates the dowelling jig to drill a hole in a smaller piece of wood.

FIGS. 7-10 illustrate use of the dowelling jig. Referring initially to FIG. 7, the dowelling jig is in the upright position illustrated in FIGS. 1-4. A work piece 32 comprising a square piece of wood is clamped in a vertical manner to the dowelling jig and specifically, the lower horizontal edge of work piece 32 sits on top of platform 25. The various drill guide members 13 can be slid into the desired position and then clamped against upper rail member and lower rail member in the manner described above. If necessary, the height of platform 25 can be adjusted. Once everything has been adjusted to suit and tightly clamped in place, a handheld drill 33 containing a drill bit passes through the smooth opening comprising the insert 23 in each drill guide member 13 to drill a hole into work piece 32. As illustrated in FIG. 7, six drill guide members 13 have been positioned and clamped in place to enable six holes to be very quickly and accurately drilled along the lower horizontal edge of work piece 32. Work piece 32 also abuts against stop member 31. Once one edge has been drilled, the work piece can be loosened and rotated and clamped back in place to accurately drill holes in another edge.

Figure 10:
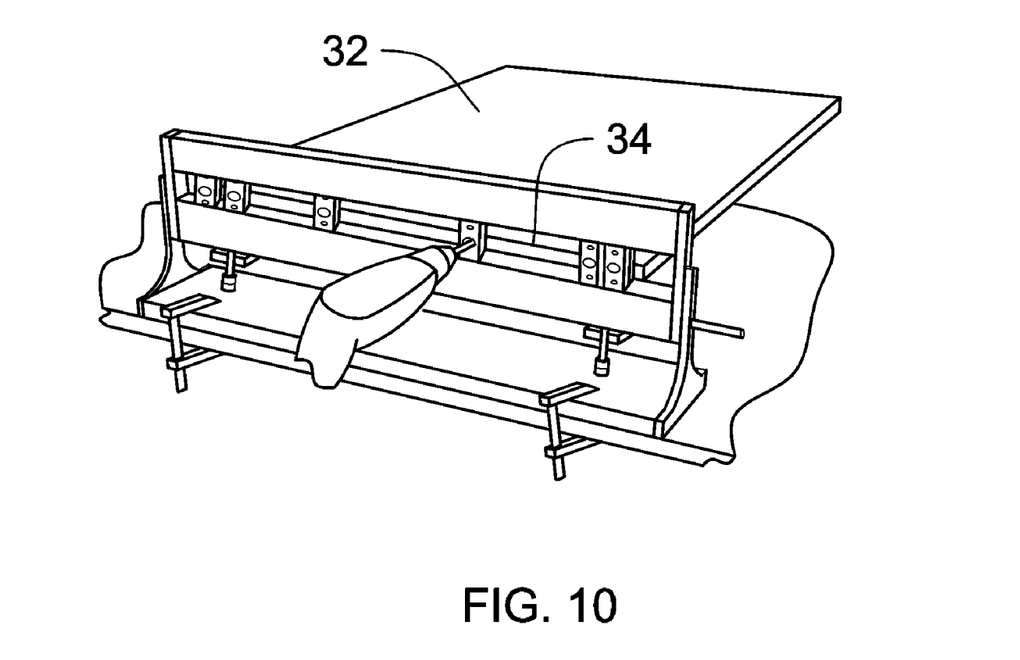
FIG. 10 illustrates how the dowelling jig can hold the work piece in a substantially horizontal position to drill holes in the edge of the work piece.

FIG. 10 illustrate how a work piece 32 can be positioned horizontally and clamped against platform 25. This allows holes to be drilled into the edge 34 of the work piece.

Figure 11:
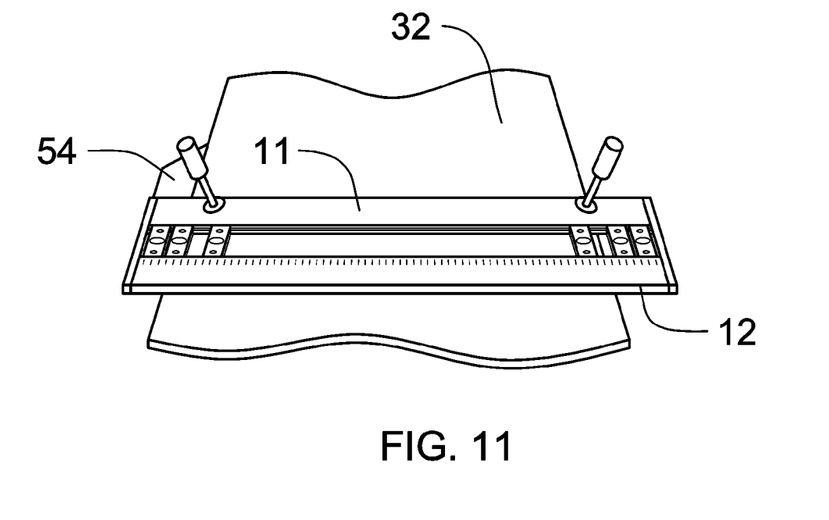
FIG. 11 illustrates a "cutdown" version of the dowelling jig to act as a template.

FIG. 11 illustrates a "cutdown" version which is basically only the upper rail member 11 and the lower rail member 12 containing the various drill guide members 13 and this version an be used as a template. An edge member 54 is provided to provide a stop for the work piece 32.

Figure 1:
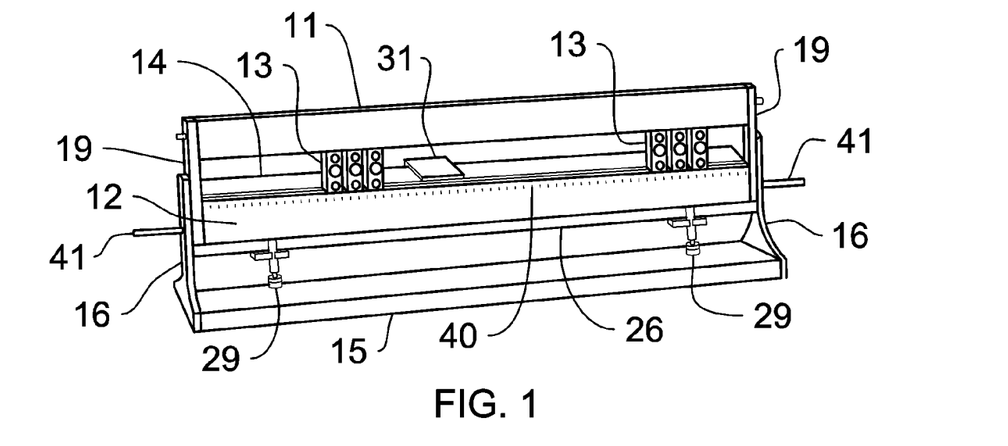
FIG. 1 illustrates a front view of the dowelling jig according to an embodiment of the invention.
Figure 2:
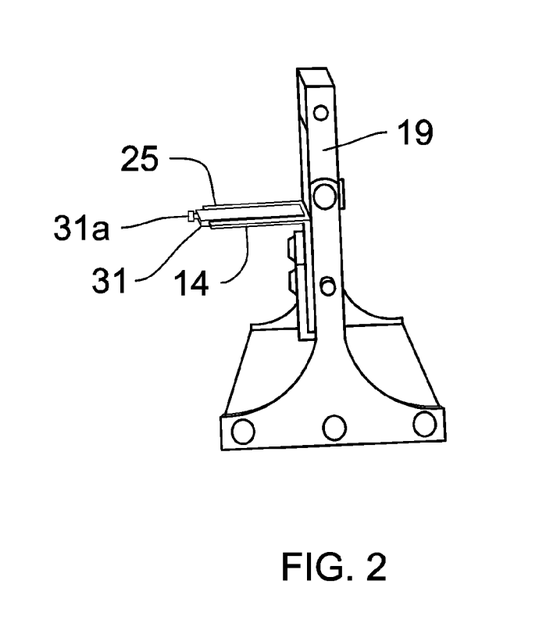
FIG. 2 illustrates a side view of the dowelling jig of FIG. 1.
Figure 3:
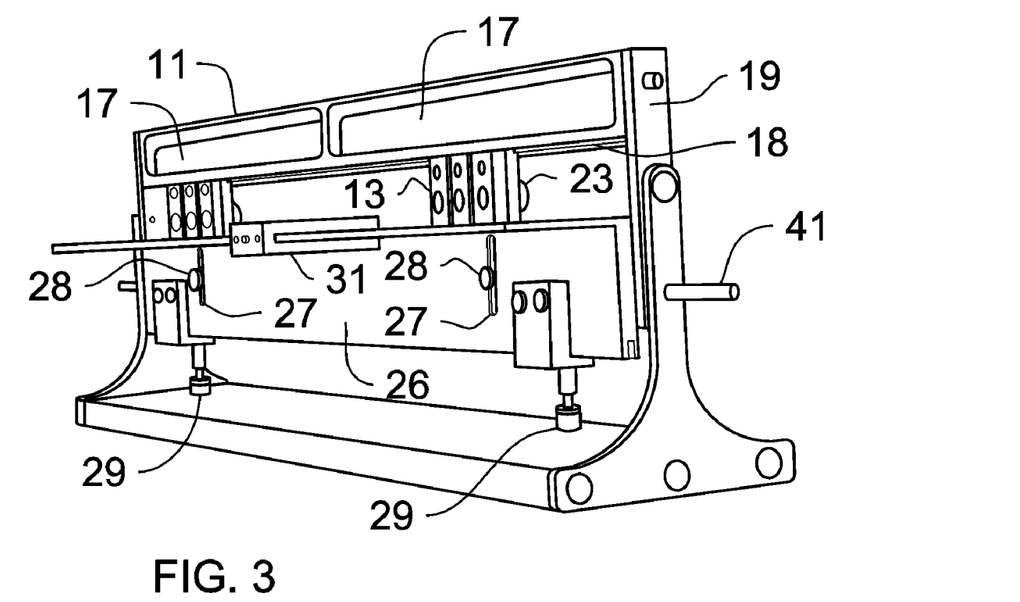
FIG. 3 illustrates a rear view of the dowelling jig according to FIG. 1.

FIG. 6 again shows the "upside down" version and illustrates bench member 14 removed from lower rail 12 to show a small pin 35 which locates in a groove 36 on the lower rail member 12 to align the indicia 30 on platform 25 with indicia 40 on the front face of lower rail member 12 (see FIG. 1 for indicia 40).

Figure 12:
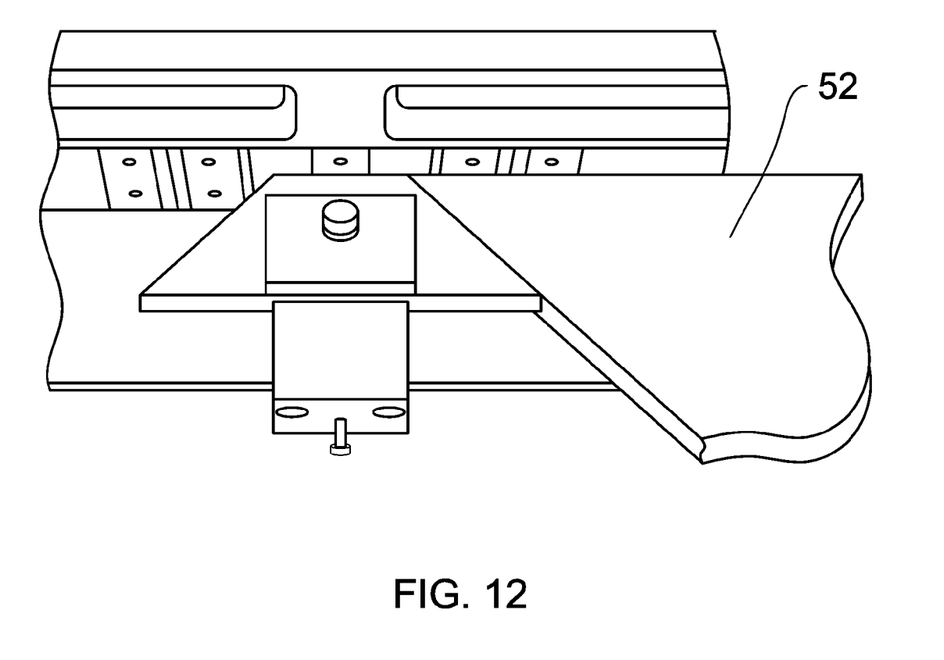
FIG. 12 illustrates a variation to enable the dowelling jig to drill hole in an angled piece of wood.

Referring to FIG. 12, there is illustrated a variation which enables an angled piece of wood 52 to be drilled.

Figure 13:
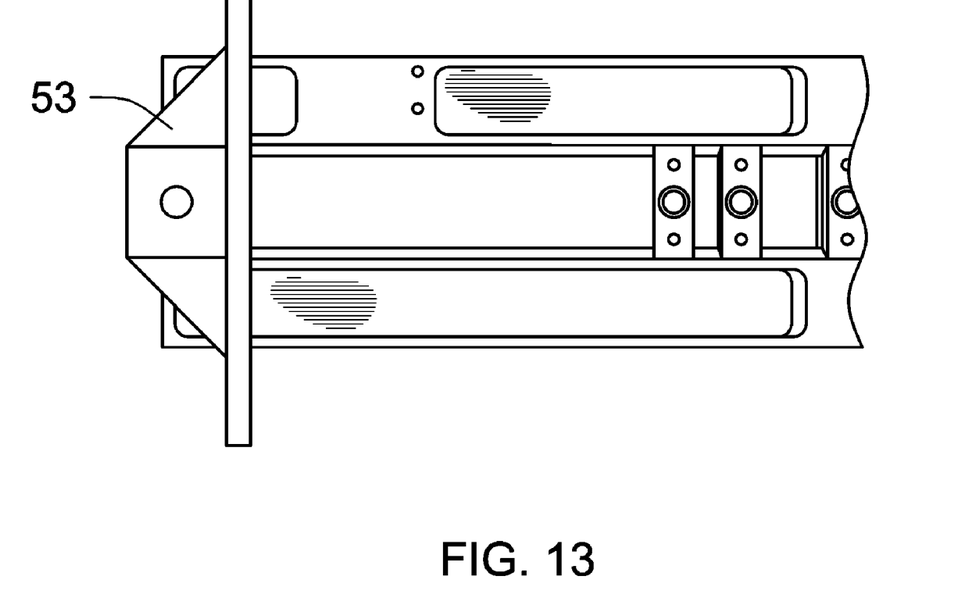
FIG. 13 is a bottom view of the "cutdown" version of the dowelling jig.
Figure 14:
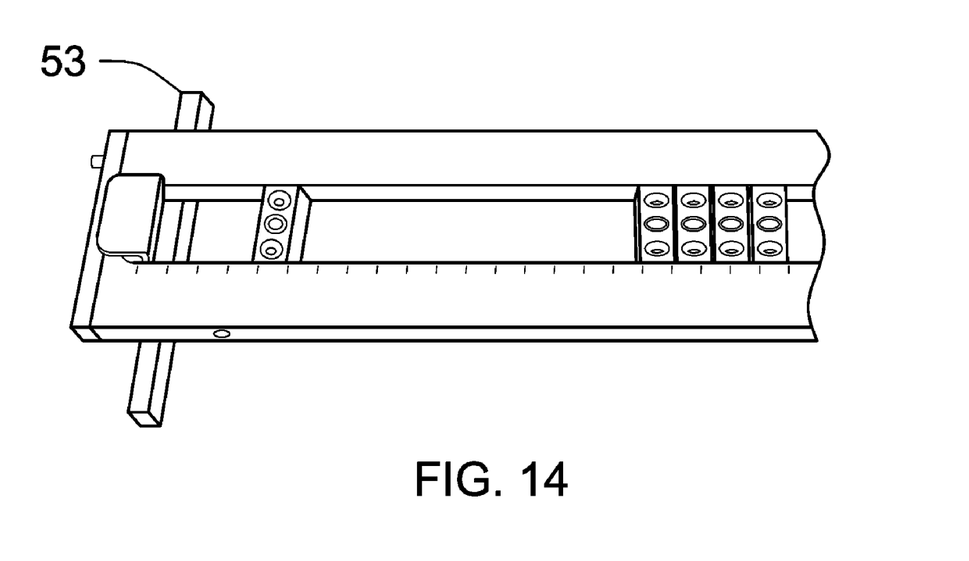
FIG. 14 is a top view of the "cutdown" version of the dowelling jig.

FIGS. 13 and 14 illustrate bottom views and top views of the "cutdown" version and particularly illustrates the stop member 53.

It can be seen that the dowelling jig is extremely versatile, highly accurate, and is simple enough to be used by DIY people.

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

Throughout the specification and claims (if present), unless the context requires otherwise, the term "substantially" or "about" will be understood to not be limited to the value for the range qualified by the terms.

It should be appreciated that various other changes and modifications can be made to any embodiment described without departing from the spirit and scope of the invention.

The invention claimed is:

1. A dowelling jig system comprising:
a pair of spaced apart rail members which comprise an upper rail member and a lower rail member;
at least one drill guide member which is slidable between said spaced apart rail members and which is releasably lockable relative to at least one of said spaced apart rail members; and
a bench member adapted to support a work piece, said bench member is adjustably attachable to at least one of said rail members;
wherein said pair of spaced apart rail members is supported above a ground surface by a support, said support comprising at least one upright member, said spaced apart rail members being pivotably attached relative to said at least one upright member.

2. The dowelling jig system according to claim 1, wherein said bench has measuring indicia associated therewith.

3. The dowelling jig system according to claim 1, wherein at least one of said spaced apart rail members comprises at least one rail to support at least one drill guide member.

4. The dowelling jig system according to claim 3 further comprising a plurality of rails to support said at least one drill guide member.

5. The dowelling jig system according to claim 3, wherein said at least one drill guide member contains means to engage with said at least one rail.

6. The dowelling jig system according to claim 5, wherein said at least one drill guide member comprises two pieces that can be attached together to form said drill guide member.

7. The dowelling jig system according to claim 5, wherein said at least one drill guide member comprises two pieces that can be attached together to form said drill guide member, and said means for engaging said at least one rail is formed by attaching said two pieces together.

8. The dowelling jig system according to claim 7, wherein said at least one drill guide member comprises a through-bore therein forming a drill bit guide.

9. The dowelling jig system according to claim 8 further comprising an insert adapted for insertion into said through-bore in said at least one drill guide member, wherein said insert contains a smooth bore extending therethrough adapted to form said drill bit guide.

10. The dowelling jig system according to claim 9, wherein at least one different insert is provided having smooth through-bores of different diameters adapted to act as drill bit guides for different sized drill bits.

11. A dowelling jig system comprising:
a pair of spaced apart rail members which comprise an upper rail member and a lower rail member joined together by end members;
at least one drill guide member which is slidable between said spaced apart rail members and which is releasably lockable relative to at least one of said spaced apart rail members, said at least one drill guide defining a through bore and comprising an insert insertable into said through bore, said insert defining an opening extending therethrough adapted to receive a drill bit therethrough;
a bench member adapted to support a work piece, said bench member being attachable relative to at least one of said rail members; and
a support for supporting said rail members above the ground, wherein said support comprising at least one upright member, said spaced apart rail members being pivotably attached relative to said at least one upright member;
wherein said bench member having a tor platform which is substantially horizontal in use, and a vertical part, said vertical part having a pair of spaced apart vertical slots adapted to receive fasteners used to clamp said vertical part to said lower rail member allowing for the height of said bench member to be adjusted relative to said drill guide members.

12. The dowelling jig system according to claim 11 further comprising a stop member for providing an edge for a work piece to enable the work piece to be correctly positioned relative to said drill guide member, said stop member being slidable and attachable to said top platform of said bench member.

13. The dowelling jig system according to claim 11, wherein a lower horizontal edge of said upper rail member and an upper horizontal edge of said lower rail member is each provided with a rib to slidingly support and clamp said at least one drill guide member, wherein said drill guide member is comprised of two joinable pieces each comprising a top and bottom edge each of which forming part of a channel when said two pieces are joined together, said channels being engagable with said ribs allowing said drill guide member to slide along said rail members.

14. A dowelling jig system comprising:
a pair of spaced apart rail members which comprise an upper rail member and a lower rail member joined together by end members, said upper rail member having a lower horizontal edge featuring a rib therealong, said lower rail member having an upper horizontal edge featuring a rib therealong;
at least one drill guide member which is slidable between said spaced apart rail members and which is releasably lockable relative to at least one of said spaced apart rail members, said at least one drill guide defining a through bore and comprising an insert insertable into said through bore, said insert defining an opening extending therethrough adapted to receive a drill bit therethrough, said drill guide member being comprised of two joinable pieces each comprising a top and bottom edge each of which forming part of a channel when said two pieces are joined together, said channels being engagable with said ribs of said upper and lower rail members allowing said drill guide member to slide along said rail members;
a bench member adapted to support a work piece, said bench member having a top platform which is substantially horizontal in use, and a vertical part, said vertical part having a pair of spaced apart vertical slots adapted to receive fasteners used to clamp said vertical part to said lower rail member allowing for the height of said bench member to be adjusted relative to said drill guide members;

a stop member for providing an edge for a work piece to enable the work piece to be correctly positioned relative to said drill guide member, said stop member being slidable and attachable to said top platform of said bench member; and a support for supporting said rail members above the ground, said support comprising a horizontal flat base plate and a pair of vertical upright members each of which being pivotally attachable to one of said end members of said rail members.

15. The dowelling jig system according to claim 10, wherein said insert and said at least one different insert each being threadably received in said through-bore in said at least one drill guide member, thereby clamping said two pieces of said drill guide member together and clamping said two pieces to said at least one rail.

16. The dowelling jig system according to claim 1, wherein said bench member having a top platform which is substantially horizontal in use, and a vertical part, said vertical part having a pair of spaced apart vertical slots adapted to receive fasteners used to clamp said vertical part to said lower rail member allowing for the height of said bench member to be adjusted relative to said drill guide members.

17. The dowelling jig system according to claim 1 further comprising a stop member for providing an edge for a work piece to enable the work piece to be correctly positioned relative to said drill guide member, said stop member being slidable and attachable to said bench member.

* * * * *